Patented Sept. 19, 1939

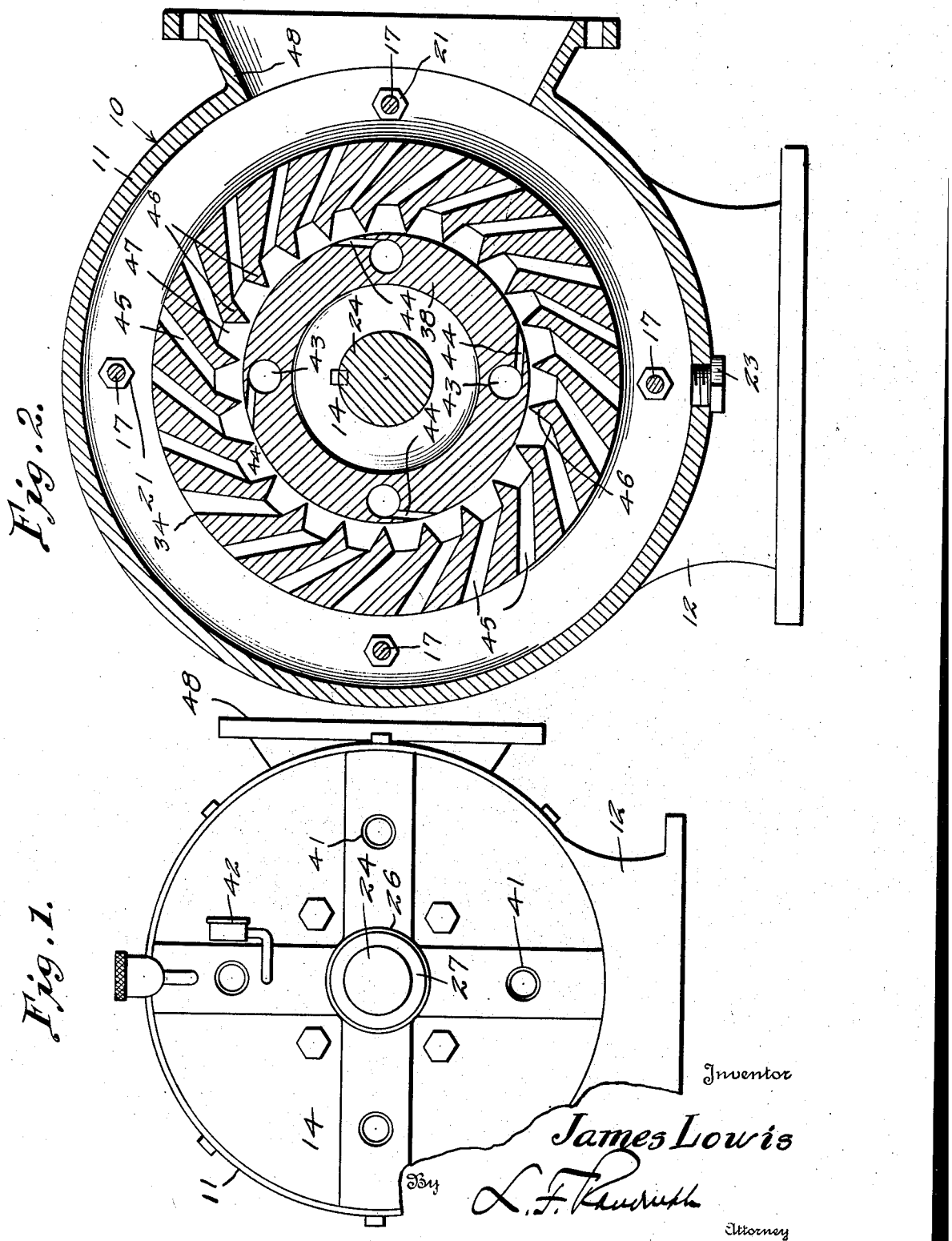

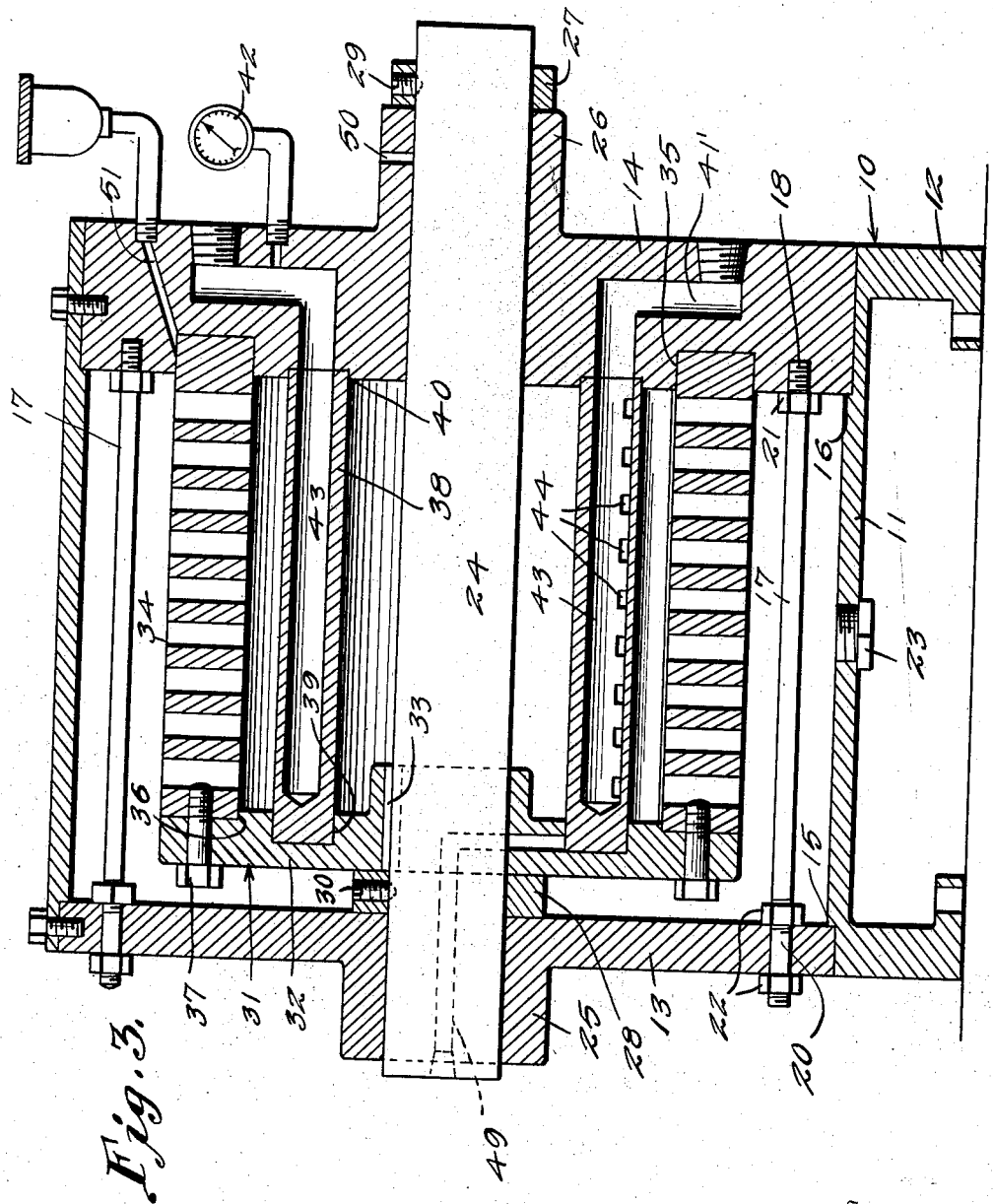

2,173,786

UNITED STATES PATENT OFFICE 2,173,786

TURBINE

James Lowis, Brooklyn, N. Y.

Application March 31, 1938, Serial No. 199,251

3 Claims. (Cl. 253—79)

This invention relates to a turbine and it aims to provide a novel construction adapted to utilize a fluid, particularly steam in a more economical and efficient manner.

It is especially aimed to provide in such a turbine, a novel annular nozzle so co-acting with the structure as to avoid the use of packing in that it acts as a steam seal so that the steam will not pass through the bearings to the shaft, and also acts as a steady bearing for the rotor.

The more specific objects and advantages will become apparent from a consideration of the description following taken in connection with accompanying drawings illustrating an operative embodiment.

In said drawings:

Figure 1 is a view of the turbine in end elevation;

Figure 2 is a vertical cross sectional view through the turbine, and

Figure 3 is a vertical longitudinal sectional view through the turbine.

Referring specifically to the drawings wherein like reference characters designate like or similar parts, the turbine includes a stator generally designated 10 and consisting for instance of a cylinder 11 provided with mounting standards 12, and end plates 13 and 14 extending into the cylinder and abutting shoulders 15 and 16 thereof. Such parts are detachably connected together steam tight by means of rods or bolts 17 screw threaded at 18 into the end plate 14, extending through openings 20 in the end plate 13, in combination with nuts 21 and 22, threaded on such bolts 17. A drain plug 23 is removably screw threaded in the cylinder 11.

The main shaft of the turbine designated 24 is journaled in bearings 25 and 26, provided on the end plates 13 and 14 and has thrust collars 27 and 28 secured thereto by screws 29 and 30.

Rotatable with the shaft 24 is a rotor 31 consisting of a disk or head 32 keyed to shaft 24 at 33, and an annular body 34. Said body 34 extends removably and snugly into an annular groove 35 in the inner surface of wall 14 concentric with shaft 24 and fits about a shoulder 36 provided on the inner surface of head 32, bolts 37 passing through head 32 and securing the same to the body 34.

Concentric with shaft 24 and inwardly of body 34, is a tubular nozzle member 38 which is seated removably but steam tight at its opposite ends in annular grooves 39 and 40, in the inner faces of the head 32 and wall 14, being held rigidly to the latter wall as by means of bolts passing through the wall 14 and into the nozzle, as at 41. The head 32 turns on the other end of the nozzle 38. The tight fit and particular structure of these parts provides against the escape of steam to the shaft and enables me to avoid the use of packing. Body 34 of course turns in the annular groove 35.

The end wall 14 in effect forms a steam chest, since it has any desired number of passages 41' therethrough adapted to communicate with supply pipes for steam, leading from any desired source, and which supply pipes have cut-off valves therein so that the supply may be completely cut-off or regulated according to requirements or desire. A steam gauge 42 may be arranged in communication with one of the passages 41'.

Said tubular nozzle body 38 has in its wall, a longitudinal passage or manifold 43, one for each passage 41' and communicating therewith. Rows of tangentially disposed outlet orifices 44 are provided in the nozzle body, leading from each passageway or manifold 43.

Rows of openings are provided tangentially or at an angle through the wall of the rotor body 34 and between the same at the inner surface of the body, longitudinally extending ribs 46 are provided, such ribs being pointed at their inner extremities and being triangular in cross section whereby they afford outwardly converging entrances 47 to the said passages or ports 45.

As a result of the structure disclosed, the steam admitted through any of the desired number of passages 41', and under appropriate valve control, will pass to the manifolds 43, escape therefrom through the ports or orifices 44 into the outwardly converging entrances 47 and thence into the passages or ports 45, impinging against the walls of the ports, and thereby imparting rotation to the rotor, and the shaft 24, the steam or fluid escaping into the cylinder 11 and thence to the atmosphere or otherwise at an outlet 48.

The direction of rotation is determined by the angularity of the walls of passages or ports 45 and to this end, each motor may have two of the bodies 34, one like that disclosed in the drawings and the other with the passages 45 arranged at the opposite angle. It is preferable however to dispose the body 34 so that it may be reversed end to end, to thereby reverse the inclination of the ports or passages 45, to control the direction of rotation.

The various parts may be suitably lubricated as through passages at 49, 50 and 51, for example.

Various changes may be resorted to provided they fall within the spirit and scope of the invention.

I claim as my invention:

1. A turbine having a stator, a shaft rotatable therein, a stationary nozzle comprising a removable tubular body extending inwardly, fluid tight from a wall of the stator, said nozzle having passage means for the supply of fluid thereto and discharge therefrom, a rotor connected to said shaft operable by the discharged fluid, said nozzle body being cup shaped and at its open end being in fluid tight and steady bearing relation to the rotor, said stator having an end wall through which the fluid is supplied, said end wall having annular passages in which the nozzle body and the rotor are seated.

2. A turbine of the class described having a shaft, a rotor, said rotor being of cup shape and including a head keyed to said shaft and an annular body having angularly disposed ports therethrough, nozzle means disposed inwardly of the annular body, said nozzle comprising a removable tubular body extending inwardly, fluid tight and rigidly from a wall of the stator, the inner end of said nozzle serving as a steady bearing for the rotor, means for the supply of power fluid through the nozzle to said passages, a stator having an end wall provided with passage means for fluid to the nozzle body, said end wall having annular grooves in its inner surface, the nozzle body extending fluid tight into one of said grooves and said annular body extending into the other of said grooves, said head being provided with an annular groove into which the nozzle body extends fluid tight, said head having a shoulder engaged by the annular body.

3. A turbine of the class described having a shaft, a rotor, said rotor being of cup shape and including a head keyed to said shaft and an annular body having angularly disposed ports therethrough, nozzle means disposed inwardly of the annular body, said nozzle comprising a removable tubular body extending inwardly, fluid tight and rigidly from a wall of the stator, the inner end of said nozzle serving as a steady bearing for the rotor, means for the supply of power fluid through the nozzle to said passages, a stator having an end wall provided with passage means for fluid to the nozzle body, said end wall having annular grooves in its inner surface, the nozzle body extending fluid tight into one of said grooves and said annular body extending into the other of said grooves, said head being provided with an annular groove into which the nozzle body extends fluid tight, said head having a shoulder engaged by the annular body, said stator also having a second end wall, a cylinder bridging the end walls, and bolt means extending from one end wall to the other.

JAMES LOWIS.